United States Patent
Campanari et al.

(10) Patent No.: US 12,515,885 B2
(45) Date of Patent: Jan. 6, 2026

(54) CONVEYOR SYSTEM WITH SYSTEM FOR DETECTING THE STATE OF WEAR AND TEAR AND/OR DEFECTS AND RESPECTIVE METHOD

(71) Applicant: CICSA S.R.L., Brivio (IT)

(72) Inventors: Stefano Campanari, Brivio (IT); Marco Campanari, Brivio (IT)

(73) Assignee: CICSA S.R.L., Brivio (IT)

( * ) Notice: Subject to any disclaimer, the term of this patent is extended or adjusted under 35 U.S.C. 154(b) by 150 days.

(21) Appl. No.: 18/573,814

(22) PCT Filed: Jun. 28, 2022

(86) PCT No.: PCT/IB2022/055968
§ 371 (c)(1),
(2) Date: Dec. 22, 2023

(87) PCT Pub. No.: WO2023/281354
PCT Pub. Date: Jan. 12, 2023

(65) Prior Publication Data
US 2024/0327131 A1  Oct. 3, 2024

(30) Foreign Application Priority Data
Jul. 5, 2021 (IT) .......... 102021000017696

(51) Int. Cl.
*B65G 43/02* (2006.01)
*B65G 17/12* (2006.01)
*B65G 17/38* (2006.01)

(52) U.S. Cl.
CPC .......... *B65G 43/02* (2013.01); *B65G 17/12* (2013.01); *B65G 17/38* (2013.01); *B65G 17/126* (2013.01);
(Continued)

(58) Field of Classification Search
CPC .......... B65G 43/02; B65G 17/12; B65G 17/38; B65G 17/126; B65G 2203/0266;
(Continued)

(56) References Cited

U.S. PATENT DOCUMENTS

| 4,566,339 A | * | 1/1986 | Davidson | G01L 5/047 |
| | | | | 73/773 |
| 4,803,886 A | * | 2/1989 | May | G01L 5/102 |
| | | | | 73/773 |

(Continued)

FOREIGN PATENT DOCUMENTS

| DE | 1246546 B | 8/1967 |
| DE | 4027758 A1 | 3/1991 |
| DE | 20121622 U1 | 1/2003 |

OTHER PUBLICATIONS

International Search Report and Written Opinion for Corresponding International Application No. PCT/IB2022/055968, 15 pages, Oct. 25, 2022.

*Primary Examiner* — Mark A Deuble
(74) *Attorney, Agent, or Firm* — LUCAS & MERCANTI, LLP

(57) ABSTRACT

A conveyor system having a transmission assembly with a closed transmission chain is disclosed. The transmission assembly includes a drive shaft connected to the transmission chain, a conveyor element connected to the chain, a detection system to detect the state of wear and/or defects of the transmission assembly. The detection system has a sensor connected to the transmission assembly and is equipped with a data transmission module and a control unit in communication with the sensor which receives data from the sensor and to detect wear and/or defects of the transmission assembly. The transmission assembly of the conveyor system includes a smart link having an optical or electromagnetic target that is detected by a fixed sensor, or (Continued)

detector, and is capable of detecting such target for the purpose of determining the state of wear and/or the position and/or speed of such smart link.

13 Claims, 3 Drawing Sheets

(52) U.S. Cl.
 CPC ............... *B65G 2203/0266* (2013.01); *B65G 2203/0275* (2013.01); *B65G 2203/0283* (2013.01); *B65G 2203/0291* (2013.01); *B65G 2203/044* (2013.01); *B65G 2207/48* (2013.01)

(58) Field of Classification Search
 CPC .... B65G 2203/0275; B65G 2203/0283; B65G 2203/0291; B65G 2203/044; B65G 2207/48; B65G 19/20; G01B 21/06
 See application file for complete search history.

(56) References Cited

U.S. PATENT DOCUMENTS

| | | | | |
|---|---|---|---|---|
| 6,851,546 | B2 * | 2/2005 | Lodge | B65G 43/02 |
| | | | | 198/810.04 |
| 9,429,489 | B2 * | 8/2016 | Goldstein | B62J 50/22 |
| 9,592,866 | B2 * | 3/2017 | Hasselbusch | B62D 55/20 |
| 9,772,179 | B2 * | 9/2017 | Frost | B65G 43/02 |
| 9,896,276 | B2 * | 2/2018 | Brown | B65G 43/02 |
| 10,392,193 | B2 * | 8/2019 | Walker | B65G 23/22 |
| 10,640,299 | B1 | 5/2020 | Szazdi, Jr. | |
| 2007/0114110 | A1 * | 5/2007 | Frost | B65G 43/00 |
| | | | | 198/502.3 |
| 2008/0047804 | A1 | 2/2008 | Rathbun et al. | |

* cited by examiner

CONVEYOR SYSTEM WITH SYSTEM FOR DETECTING THE STATE OF WEAR AND TEAR AND/OR DEFECTS AND RESPECTIVE METHOD

CROSS-REFERENCE TO RELATED APPLICATIONS

This application is a 371 of PCT/IB2022/055968, filed Jun. 28, 2022, which claims the benefit of Italian Patent Application No. 102021000017696, filed Jul. 5, 2021.

FIELD OF THE INVENTION

This invention refers to a conveyor system with a system for detecting the state of wear and/or defects and the respective method for detecting the state of wear and/or defects of the aforesaid conveyor system.

In particular, the present invention refers to a conveyor system for conveying materials with a system for detecting the state of wear and/or defects of its components, more specifically to a conveyor system using chains as a driving element. As mentioned above, the present invention also refers to the respective method for detecting the state of wear and/or defects of the components of the conveyor system using chains.

BACKGROUND OF THE INVENTION

In the industrial context, the use of conveyor systems conveying materials is particularly widespread, specifically for materials in bulk or in individual pieces or parts. The choice of the conveyor system most suitable for the circumstance is influenced by the industrial sector and the use to which the conveyor system is intended. The best known and most widespread categories of conveyor systems are: conveyor belts, roller conveyors, screw conveyors and chain conveyors.

With regard to the last item in the list set forth above, the category of chain conveyors is particularly appreciated for conveying products both in the agro-food and chemical fields and in the heavy industry (iron and steel, automotive, mining, quarrying industries). Chain conveyors can be horizontal, inclined or vertical, with straight paths or with one or more changes of direction; in the case of vertical conveyors, they are called elevators. Specifically, chain conveyors ensure a longer life cycle than other categories of conveyor systems and have a high resistance to abrasiveness and high temperatures. These characteristics make them particularly adapted to be used in industrial sites whose atmosphere is particularly dusty.

In their most general form, said chain conveyor systems are composed of a transmission chain closed and wound around at least two shafts, at least one of which is a drive shaft. These shafts are generally equipped with crowns or cogwheels for the transmission of motion to the aforesaid chain. Typically, the chain is composed of a plurality of links, which may be composed of individual links (link chains) or multiple elements (e.g. plates, pins and possible bushings in articulated chains, also known as mechanical-type chains), interconnected to each other to form a closed curve, sometimes called catenary or chain flexing. Said links are rigid elements with various possible shapes (e.g. plates connected to each other by pins or pins and bushings; or rings, linked to each other) interconnected so as to ensure the reciprocal movement between the links with at least one degree of freedom and, therefore, to allow the chain to run along curved lengths, e.g. at the crowns carried by the shafts.

Combined with the chain there are one or more conveyor elements, e.g. buckets, drag scraper elements or supporting elements, which are moved by the same chain and are designed to convey material, typically but not necessarily bulk material, for at least one part of the chain's extension.

Due to the particularly critical working conditions under which they often have to operate, chain conveyor systems are frequently highly stressed and subject to heavy operations in terms of conveyed capacities and mechanical stresses. Furthermore, the presence of abrasive materials, process debris and sometimes foreign bodies, which often get inside the mechanical components, could compromise the integrity of the conveyor system components.

Therefore, despite the greater constructive solidity compared to other categories of conveyor systems, chain conveyors are subject to rapid wear which, if neglected, leads to malfunctions or faults. The resolution of these problems requires a temporary shutdown of the conveyor system to proceed with the inspection operations and the repair or replacement of worn or damaged components. The resolution of failures and faults therefore implies often rather long downtimes, which impact on the performance of the entire production plant with often considerable repercussions also from an economic point of view.

In order to avoid downtimes of the conveyor system due to faults of its mechanical components, to date, periodic inspections are provided with the aim of identifying possible worn components which, if further kept in service, could be the cause of malfunctions and, consequently, long downtimes. These periodic inspections are typically carried out, at intervals of the order of some months, by specialised personnel, possibly with the aid of special instrumentation, and require that the conveyor system is in a state of shut-down, that special inspection doors have been opened and/or protection and covering parts of the system have been dismounted and, in most cases, that the system has been emptied of the conveyed material. Even if the system is shut down, the inspection operations expose workers to safety risks, as they have to work in the proximity of the conveyor system, in contact with relevant quantities of the conveyed material, with possible dustiness and/or toxicity problems, and often also to work at considerable heights above the ground. Therefore, it is particularly felt in the industrial sector, and in particular in the industry using chain conveyor systems, the need to be able to prevent problems of excessive stresses due to the establishment of abnormal operating conditions that can lead to risks of breakages of mechanical components and to be able to continuously check the state of wear of the aforesaid components so as to optimally schedule their maintenance or periodic replacement, thus maximising the useful life of the components and the operativeness of the conveyor system.

U.S. Pat. No. 10,640,299 B1 describes a system for detecting the wear condition of the teeth of a motion transmission gear of a conveyor chain, in which special sensors are arranged at the ends of the gear teeth and a fixed detector performs measurements of operating parameters detected by the aforesaid sensors. U.S. Pat. No. 10,640,299 B1 does not concern the detection of the wear of the links of the conveyor chain.

U.S. Patent Application 2008047804 A1 relates to a system for detecting the wear or defects of a link of a conveyor chain, which comprises two fixed optical detectors capable of measuring at least the distance between two consecutive pins of a conveyor link. No special sensors combined directly with the links of the conveyor chain are provided.

The German Patent DE 20121622 U1 refers to a system for detecting the state of wear of a conveyor chain, in which each of the links of the chain comprises a strain gauge that sends, to a remote receiver, signals corresponding to the state of deformation/tension to which the link is subjected and which is detected by the strain gauge. The variability of the state of deformation/tension to which each link is subjected, depending on external characteristics such as the load conveyed, the temperature, etc., can make the application to other types of conveyor chains difficult and the strain gauge's detections inaccurate, in particular for the purpose of reconstructing the component wear.

SUMMARY OF THE INVENTION

Object of the present invention is therefore to compensate for the aforesaid drawbacks of the known art. Thus, object of the present invention is, therefore, to provide a material conveyor system which is capable of continuously detecting the state of wear and/or defects of the components of the same conveyor system, so as to be able to schedule its periodic maintenance or replacement and prevent excessive stresses which could lead to faults or breakages.

Another object of the present invention is to provide a method for detecting the state of wear and/or defects of a conveyor system which allows a continuous check of the conditions of the same conveyor system and which signals the possible presence of failures or the need to provide maintenance or preventive replacement operations of one or more components of the conveyor system.

These and other objects are achieved by a conveyor plant according to claim 1 and a method for detecting the state of wear and/or defects of a conveyor plant according to claim 9. Preferential aspects of the present invention are introduced in the dependent claims.

In accordance with the above, the present invention concerns a conveyor system for conveying materials, more specifically a chain conveyor system. In the present document, the term "chain conveyor system" means any conveyor system using a chain of any kind as a driving element for conveying materials in the horizontal, oblique, vertical directions, or any combination of the previous directions to create articulated paths. For example, bucket conveyors/elevators and drag chain conveyors belong to this category of conveyor systems.

According to an aspect, said conveyor system comprises a transmission assembly. Said transmission assembly comprises at least one closed transmission chain. Said at least one chain is composed of a plurality of links interconnected to each other, to form a closed curve, further called chain flexing or catenary. According to the embodiment, said at least one chain can be a chain with links or an articulated chain, i.e. formed by plates or analogous components, interconnected to each other by means of pins and possibly bushings.

The transmission assembly further comprises at least one drive shaft operatively connected to said transmission chain for a motion transfer. Said at least one drive shaft is rotated by at least one motor, typically an electric motor, and is equipped with members for contacting and interacting with said chain in order to make the motion transfer more efficient. Preferably, said members for contacting and interacting with said chain comprise at least one crown or one toothed wheel adapted to interact with the plurality of links to transfer the rotary motion of the drive shaft to the aforesaid chain. Still preferably, the transmission assembly comprises one or more free idler stations comprising, e.g., an idle crown or an idle toothed wheel. The transmission chain is therefore fitted on said at least one drive shaft and, if present, said one or more idler stations.

According to another aspect, the conveyor system comprises at least one conveyor element designed for conveying materials. Said conveyor element is connected to said chain to be carried by the same chain. Depending on the embodiment of the conveyor system, the conveyor elements carried by the chain can be extremely different from each other. In an embodiment, the conveyor elements can take the form of containers or tanks, commonly called buckets, adapted to be filled with a given quantity of material in a first position of the chain and to be unloaded in a second position of the chain. In another embodiment, the conveyor element is a drag scraper element adapted to drag material for a length of path usually delimited by side partitions, along the extension of the chain.

According to a further aspect of the present invention, the conveyor system comprises a system for detecting wear and/or defects. Said detection system is operatively connected to said transmission assembly, e.g. in one or more points of the catenary, and is designed to detect the state of wear and/or defects of said transmission assembly or of at least part of its components. In the present description, the term "wear" means the deterioration or attrition that the components of the transmission assembly undergo during the life cycle of the conveyor system. The term "defects", on the other hand, means a failure or fault condition that leads to malfunction, or even shutdown, of the conveyor system. It should therefore be understood that the defects is a condition of greater severity than wear, which, if neglected over time, can lead to defects. Defects can also be determined by other factors, such as overload or presence of excessive temperatures on the components of the transmission assembly.

Said system for detecting wear and/or defects comprises at least one sensor. Said at least one sensor is operatively connected to said transmission assembly to detect at least one operating parameter of said transmission assembly. In other words, the at least one sensor detects the status of the transmission assembly in one or more points of the same transmission assembly. This at least one sensor is equipped with a data transmission module designed to transmit data representative of said detected operating parameters.

Furthermore, the system for detecting wear and/or defects comprises at least one control unit. Specifically, said control unit is in communication with said at least one sensor. According to an aspect, the control unit is designed to receive the data collected and sent, by means of said data transmission module, from said at least one sensor and to detect a state of wear and/or defects of said transmission assembly.

Advantageously, the conveyor system described above allows to detect a state of wear and/or defects of at least one of the components of the transmission assembly and, in particular, of at least part of the links of the conveying chain, or of part of the components of the latter, without subjecting the entire system to momentary shutdowns to allow inspection operations by specialised personnel.

Still advantageously, the conveyor system according to the present invention allows to continuously check the state of wear of the transmission assembly in order to accurately schedule any preventive maintenance, thus avoiding that the excessive attrition of the components leads to major faults and breakages, which lead to long downtimes of the entire conveyor system or, on the contrary, thus avoiding too early and prudent replacements of the same components.

Here and hereinafter, the term "sensor" assumes the generic meaning of mechanical, electronic, electromagnetic, optical or even chemical device, which in apparatuses or mechanisms or components, i.e. in any physical system, detects the values of a physical quantity and transmits them to a measurement or control system, such as e.g. the control unit.

In this sense, a sensor of the type described and claimed here may consist of a single device, internally or externally powered by an energy source, which is capable of detecting a variation in a physical quantity, converting it into a typically electrical (or optical, or electromagnetic, or other known type) signal and transmit this signal to a control or measurement system, such as a control unit.

For example, in accordance with the above, a sensor can consist of a single device, such as a strain gauge equipped with a signal transmission circuit or it can consist of two or more components, such as e.g. an optical target (such as e.g. graphic markers representative of the state of wear of the chain or the position of reference points on the components object of the detection-whose variation over time is indicative of elongations and wear) or an electromagnetic target (e.g. one or more permanent magnets) and, respectively, an optoelectronic detector (e.g. a laser detector) or an electromagnetic detector (e.g. of the windings in which the electromagnetic target can induce a EMF—Electro Motive Force) of these targets, which cooperate to detect a physical characteristic of the same optical or electromagnetic target.

Regardless of the architecture adopted, the sensor converts the detected values of the physical quantity and converts them into usually electrical signals (but they could also be optical or other) to be transmitted to at least one control or measurement system.

This sensor, depending on its shape, can therefore be entirely fixed to one or more movable components of the conveyor system, such as e.g. the links of the chain or the conveyor elements, or it can be entirely constrained to one or more fixed components of this conveyor system, or still it can be partially constrained to movable components and fixed components of the system. In the case of multiple sensors, these can be arranged according to any combination of the solutions set forth above.

However, according to the present invention, the aforesaid transmission assembly necessarily comprises at least one smart link which constitutes or comprises at least part of said at least one sensor. In particular, this smart link comprises at least one optical and/or electromagnetic target which is detected by at least one fixed detector, which constitutes another part of the aforesaid at least one sensor and which is capable of detecting this target optically and/or electromagnetically, respectively, in order to determine at least the state of wear and/or the position and/or the speed of this smart link.

In other words, said plurality of links of the chain of the transmission assembly comprises at least one smart link, i.e. 3a link capable of detecting, or allowing to detect, an operating parameter to which the chain is subjected at the same smart link. In this embodiment, said at least one sensor comprises said at least one smart link.

In this context, the smart link, with its optical and/or electronic and/or electromagnetic target, is designed as a passive element adapted to be intercepted and measured by at least one special fixed detector being also part of the at least one sensor of the system for detecting wear and/or defects.

In preferred embodiments, said smart link can also be designed as an active element inside the system for detecting wear and/or defects, i.e. it can also comprise a sensor capable of detecting at least one stress or mechanical strain to which the chain is subject, and sending a signal representative of the detected quantity to the control unit or to further elements having interface functions.

This smart link, which can also have a shape different from that of the upstream and downstream links to which it is connected, is at least one part or component of the aforesaid at least one sensor.

Preferably, the chain comprises multiple smart links arranged along its extension.

Preferably, in the embodiments comprising two or more smart links, they are placed at predetermined distances during the constructing step of the chain. In these embodiments, the detection system comprises two or more sensors, e.g. optical or electromagnetic sensors, which are also arranged at the same predetermined distance to which the pairs of smart links are arranged. Said pair of sensors is designed to detect a lag, represented by a time interval, of the passage of each pair of smart links.

In optimal conditions, i.e. when the chain is sufficiently new and not subject to wear, said pair of sensors detects in a basically simultaneous manner (i.e. with a small-time difference, which can be detected at the first start-ups of the conveyor system), the passage of each smart link of the at least one pair of smart links. However, following the use and wear of the chain components, a certain lag is generated, which is represented by a time interval, in the passage of the smart links with respect to the respective sensors. Said time interval is representative of the state of wear of the transmission assembly, more particularly of the state of wear suffered by the chain components.

Advantageously, the presence of at least one smart link of the aforesaid type allows to perform accurate measurements on the chain and, consequently, ensures a more reliable detection of the conditions of wear and/or defects.

Furthermore, the provision of a smart link as a component different from the other links of the conveying chain, allows to increase the flexibility of application of the system for detecting wear and/or defects of the present invention to pre-existing conveyor systems, thus allowing e.g. a quick replacement thereof.

More in detail, in a preferred embodiment, the at least one sensor comprises an optical or optoelectronic sensor, e.g. a laser sensor. For the sake of simplicity, reference will be made in the present document to an optical sensor but other sensors, e.g. of the optoelectronic type, are to be considered technical equivalents included in the object of the present invention.

This optical sensor is preferably arranged in the proximity of the chain to intercept and detect at least one portion of the chain. In this embodiment, the at least one smart link comprises graphic markers or graphic (optical) targets representative of the state of defects and/or wear of the chain or the position of characteristic points of the chain. Specifically, the optical sensor is designed to detect, i.e. intercept/frame and capture, said graphic markers. The return signal of said graphic markers is then subsequently sent, by means of said data transmission module, to the control unit for evaluating a state of defects and/or wear of the chain.

Preferably, in this embodiment, the sensor is designed to also perform time detections, which are then combined with the optical detections and sent to the control unit. Advantageously, the presence of an optical sensor arranged in the proximity of the chain but not in contact or not arranged on the same chain, allows the at least one sensor not to suffer damage due to the movements of the chain in the transmission assembly. In this embodiment, the smart link is designed as passive element within the context of the detection system, where there is a component adapted to intercept it at the time of its passage in a certain position of the conveyor system.

Preferably, the smart link may further comprise at least one precision strain gauge. Said precision strain gauge is designed to detect a stress, or a mechanical strain or a deformation, to which the chain is subjected at the aforesaid smart link.

In this embodiment, preferably, the smart link is designed to also detect the position and/or the time in which the stress measurements are carried out by the precision strain gauge. Optionally, the link smart also comprises a temperature sensor.

Advantageously, the combination of the two detections (of mechanical strain and position/time), joined with the possible temperature detection, once sent to the control unit by means of the data transmission module, allows easy identification of the state of wear or defects of one or more of the components inside the conveyor system and the temperature reached by the elements of the transmission assembly.

Said smart link may be battery-powered or implement energy/power harvesting technologies or even may be powered through antennas that intercept special external electromagnetic fields (such as RFID or the like). In this embodiment, the smart link is designed as an active element capable of measuring one or more physical quantities of interest and sending them to the control unit for an evaluation of the state of wear and/or defects. Preferably, in this embodiment, the detection system comprises a detector placed in the proximity of the chain and designed to detect the signal sent by the smart link and to act as a bridge between the smart link and the control unit.

In an embodiment, a different sensor may further be present which may also comprise means for detecting at least one stress or mechanical strain to which said chain is subjected, more specifically one or more of the links of the chain. In fact, the chain could be subjected to excessive tensions in some points of the transmission assembly due, e.g. to wear, the deposit of dust or residues, the occurrence of temporary conditions of overload of the conveyor, such as e.g. material load peaks, clogging, entry of abnormal materials. If neglected, these problems could lead to the breakage of one or more links of the chain and, therefore, to the shutdown of the entire conveyor system.

Still preferably, said at least one sensor is designed to perform the position and/or time detection of one or more components of the transmission assembly. Advantageously, the combination of the stress detection with the position and/or time information allows an easier identification of the component of the transmission assembly subject to wear and/or defects.

Still preferably, said at least one sensor is designed to also perform temperature detections of one or more components of the transmission assembly. In fact, the onset of temperatures that are too high due, e.g., to the entry of hot materials is often a cause of malfunction and accelerated wear of the components, and it is therefore useful to also carry out monitoring of the temperatures reached by the transmission assembly and its components.

Preferably, the data transmission module implements a wireless communication standard to communicate with said are control unit. Non-wired communication technologies necessary when the at least one sensor is entirely, or almost entirely, positioned on the chain, as in the embodiment of the smart link also equipped with a precision strain gauge. Depending on the embodiment, the data transmission module implements at least one of Bluetooth protocols or similar protocols for WPAN (IEEE 802.15 Standard), Wi-Fi (IEEE 802.11 Standard) or RFID, or the like.

Depending on the embodiment, the aforesaid control unit may be placed in the proximity of the at least one sensor or in a remote position with respect to the at least one sensor and, more generally, with respect to the rest of the conveyor system. For example, said control unit may be a centralised processing unit shared with other analogous conveyor systems. Alternatively, said unit control has a distributed architecture and implements a cloud-type service, in which the calculations are delegated to a central processing unit, typically a server, which is queried by an application typically residing on a PC of a known type placed on the site of the conveyor system. Alternatively again, the control unit is dedicated to a single conveyor system and has software intended to evaluate the state of wear and/or defects depending on the data received from the at least one sensor. Advantageously, the possibility of choosing the architecture of the system for detecting wear and/or defects allows considerable flexibility of the conveyor system, which can be installed in almost any industrial site.

Preferably, said control unit is designed to store multiple data sent by the at least one sensor, which are related to different time instants and/or positions. In other words, the control unit is adapted to create a database of the detections performed. Advantageously, this database can be used to extrapolate statistics or aggregated data about the wear of the chain in order to make the evaluations offered by the same control unit more accurate.

A method for detecting the state of wear and/or defects of the conveyor system described above is also object of the present invention. This detecting method comprises the following steps:
actuating said transmission assembly;
detecting, by means of said at least one sensor, at least one operating parameter of said transmission assembly;
sending said at least one operating parameter detected to said outer control unit;
evaluating a state of wear and/or defects of the transmission assembly depending on said at least one operating parameter sent. Preferably, said at least one operating parameter comprises at least one stress measurement. Even more preferably, said at least one operating parameter also comprises a time and/or space measurement.

The implementation of the aforesaid method allows, advantageously, to detect a state of wear and/or defects of at least one of the components of the transmission assembly, thus avoiding the downtimes necessary for the inspection operations by specialised personnel. Still advantageously, the detecting method described here allows to continuously check the state of wear of the transmission assembly. This way, it is possible to schedule any preventive maintenance, thus avoiding that the excessive deterioration of the components leads to more serious faults and breakages or avoiding, on the contrary, unnecessarily anticipated replacements of the components.

Preferably, the method for detecting the state of wear and/or defects of the conveyor system comprises a step of collecting and storing the time and/or space detections of the state of wear of the transmission assembly. Advantageously, the presence of database a of detections at different instants/positions allows easier detection of the component of the worn or defective transmission assembly.

Still preferably, the method for detecting the state of wear and/or defects of the conveyor system comprises a step of sending a maintenance request when a state of wear higher than a certain threshold is detected during said step of evaluating a state of wear of the transmission assembly. Advantageously, sending a maintenance request allows to carry out preventive repair or replacement operations of the worn components, before these lead to faults and breakages that could affect other components of the conveyor system.

In the embodiments of the conveyor system comprising at least one pair of smart links and at least one pair of sensors or detectors, the detecting method comprises a preliminary step of arranging said at least one pair of smart links at a certain predetermined distance along said chain and arranging said sensors at the same predetermined distance. The method further comprises a step of measuring a lag of the passage of said at least one pair of smart links with respect to said pair of sensors. This lag is representative of a state of wear of the transmission assembly, more specifically of the state of wear of the chain. In fact, in optimal conditions, i.e. in the event of null or extremely low wear, the smart links of the pair of smart links pass in a basically simultaneous manner at the pair of sensors, therefore with a very small time lag that can be measured at the first start-ups of the plant, in conditions of a substantially new chain. As a result of wear related to the use of the conveyor system, the synchronisation of passage is lost and the pair of sensors detects an increasing time lag, i.e. an increasing time interval, in the passage of the smart links at their respective sensors. This lag can be used to accurately derive the wear level of the transmission assembly. The measurement can be repeated on many subsequent events of passage of the smart links, e.g. in all the passages of an entire day, so as to allow the calculation of an accurate average value free from abnormal and occasional variations.

Advantageously, the use of pairs of smart links and sensors allows a more accurate detection of the state of wear than the simple time measurement of the revolution time of a smart link with a single sensor. In fact, the revolution time can vary depending on various factors also not related to the state of wear, such as the loads of material conveyed by the conveyed elements, voltage drops or frequency variations in the power supply of the electric motors, climatic conditions only to name a few. The detection of the lag in the passage of a pair of smart links, on the other hand, takes place over short times (in the order of a second or fractions of a second) and is therefore more closely related to the geometry of the chain and therefore to its state of wear. The greater the lag detected, the greater the state of wear of the transmission assembly.

BRIEF DESCRIPTION OF THE FIGURES

Further characteristics and advantages of the invention will become clear from reading the following description provided by way of non-limiting example, with the aid of the figures depicted in the accompanying drawings, wherein.

DETAILED DESCRIPTION OF AT LEAST ONE EMBODIMENT

Figure 1:
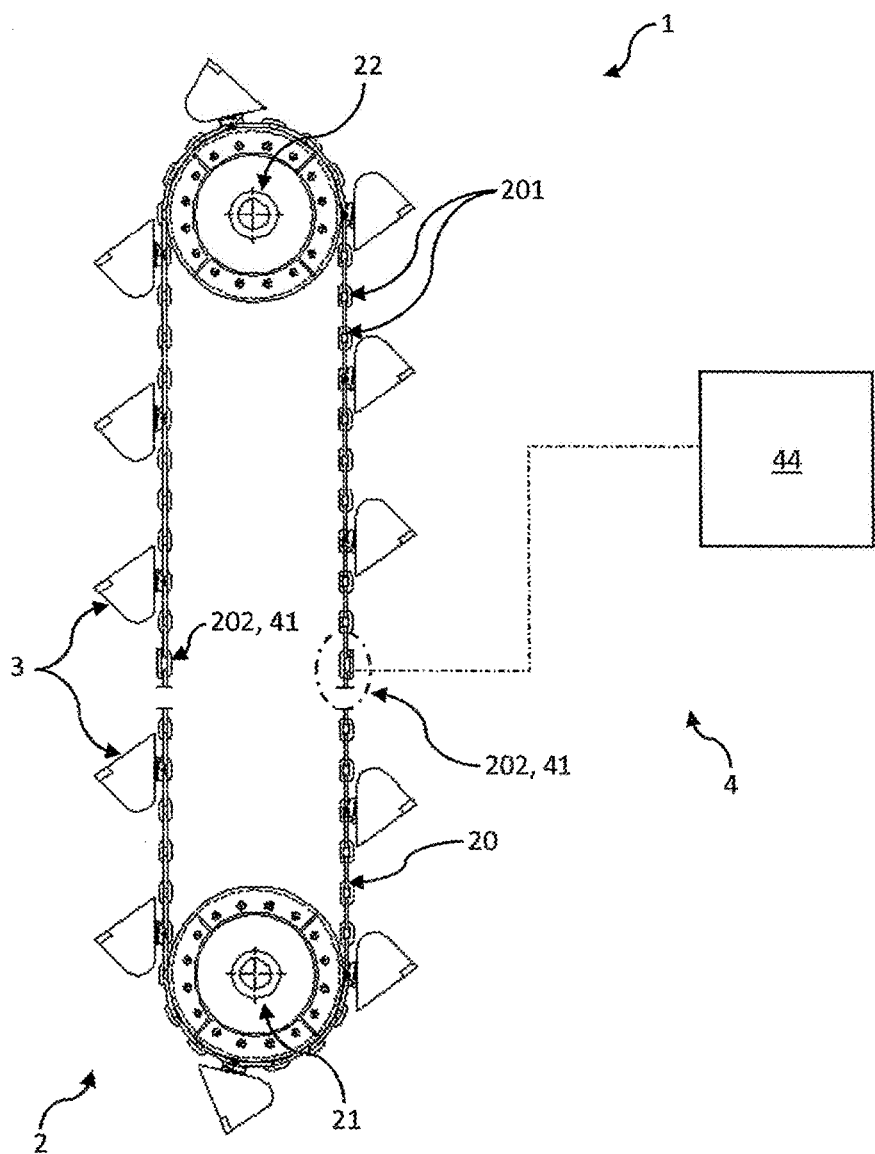
FIG. 1 depicts an embodiment of the conveyor system in accordance with the present invention.

With reference to the accompanying figures, 1 denotes a conveyor system for conveying materials, specifically a chain conveyor system 1. As already mentioned, in the present description the term "chain conveyor system" means any conveyor system using a chain as a driving element for conveying materials in the horizontal, oblique, vertical directions or a combination of the previous directions to create an articulated path. For example, bucket conveyors or drag chain conveyors belong to this category of conveyor systems.

The accompanying FIGS. 1-4 depict, in an exemplary and absolutely non-limiting manner, a bucket elevator for conveying, in the vertical direction, materials inside containers commonly referred to as buckets.

As depicted in the figures, the conveyor system 1 comprises a transmission assembly 2. Said transmission assembly 2 comprises at least one closed transmission chain 20. In the depicted embodiment, the transmission assembly 2 comprises a single chain 20. This chain 20 is a chain composed of a plurality of links 201 interconnected to each other to form a closed curve, also called chain flexing or catenary. Specifically, as depicted in FIGS. 1-4, said plurality of links 201 is composed of a plurality of rings fastened to each other. According to embodiments not depicted, said chain 20 can be an articulated chain and, therefore, said plurality of links 201 is composed of a plurality of plates, or analogous mechanical elements, connected to each other by means of pins or pins-bushing connections to ensure a relative movement between the same plates, preferably with a degree of freedom.

The transmission assembly 2 further comprises at least one drive shaft. In the embodiment depicted in FIGS. 1, 3 and 4, the transmission assembly comprises a drive shaft and a driven shaft 21 and 22 around which the chain 20 is fitted. It is to be understood that embodiments with one, two, three or more drive shafts and one or more driven shafts are in any case comprised in the object of the present description. Said drive and driven shafts 21, 22 are operatively connected to said chain 20 for a motion transfer. More precisely, said drive and driven shafts 21, 22 are rotated by at least one motor, typically an electric motor, not depicted in the accompanying figures. In the most frequent cases, there is only one motor, which rotates the drive shaft, while the driven shaft is an idle shaft, freely rotated. Generally, said drive and driven shafts 21, 22 are equipped with members for contacting and interacting with said chain 20, in order to make the motion transfer more efficient. In the depicted embodiments, said contacting and interacting members with said chain 20 comprise at least one crown or a toothed wheel adapted to interact with the plurality of links 201 to transfer the rotary motion of the drive shaft to the aforesaid chain 20. Typically, when only one drive shaft is provided, the transmission assembly 2 comprises at least one free idler station, e.g. an idle crown or an idle toothed wheel mounted on a driven shaft.

Figure 3:
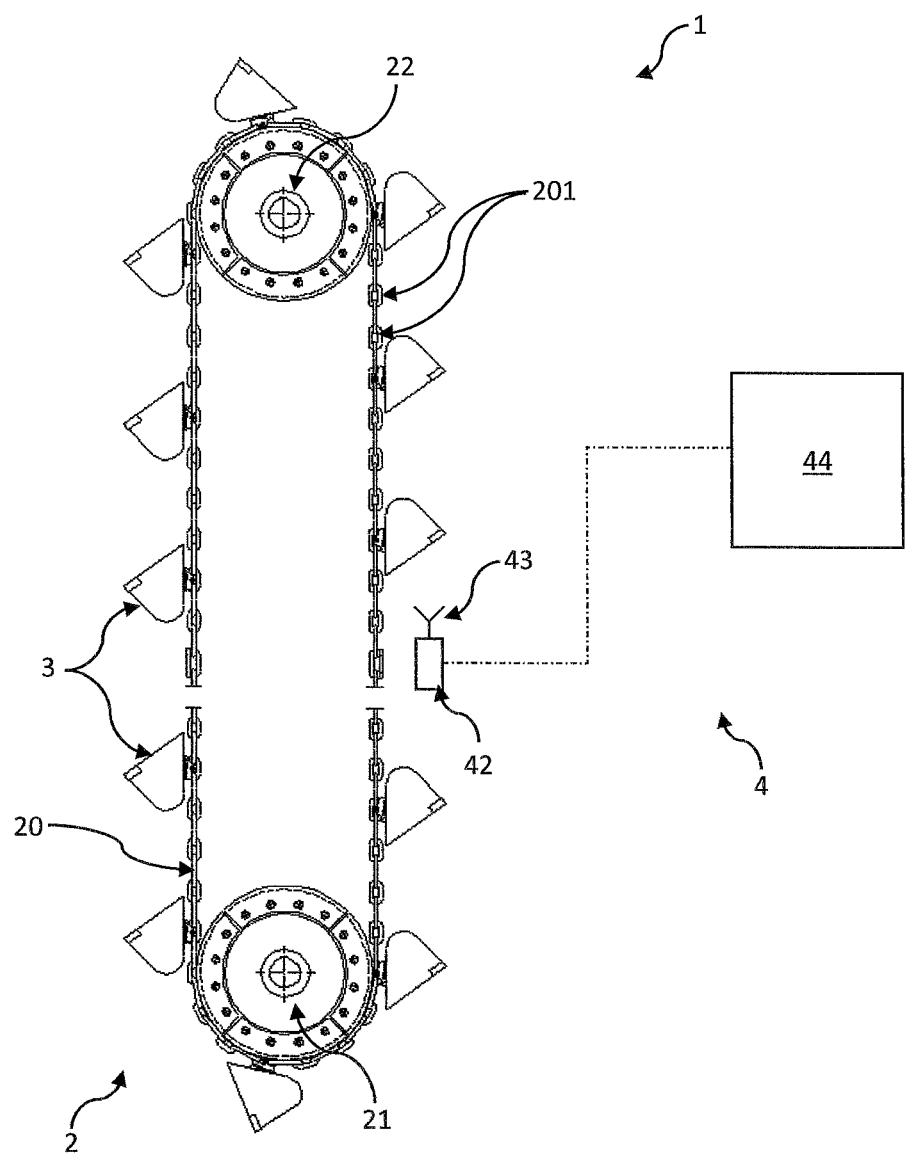
FIG. 3 depicts another embodiment of the conveyor system in accordance with the present invention.
Figure 4:
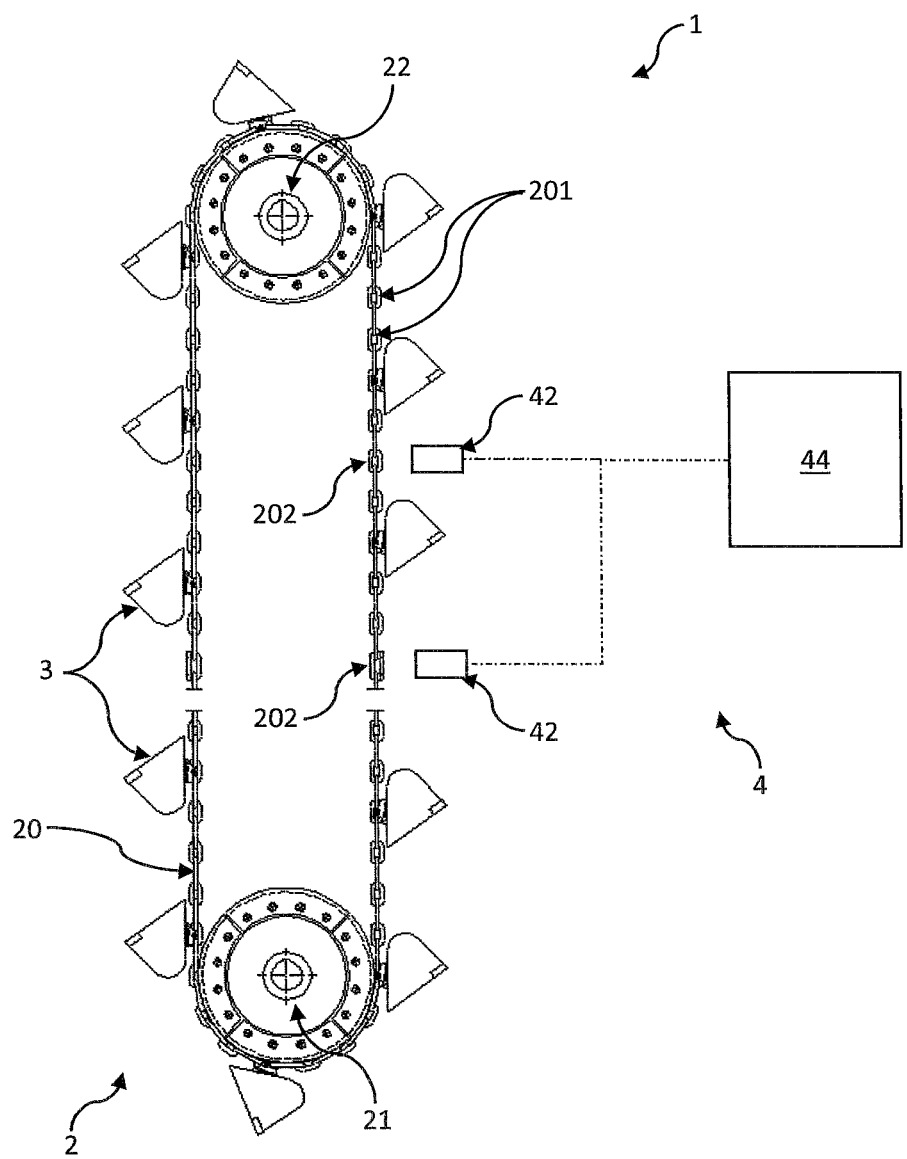
FIG. 4 depicts a further embodiment of the conveyor system in accordance with the present invention.

According to FIGS. 1, 3 and 4, the conveyor system 1 comprises at least one conveyor element 3. Said conveyor element 3 is connected to the chain 20 and is designed for conveying materials for at least one part of the extension of the chain 20. In the bucket elevator depicted in the accompanying figures, the at least one conveyor element 3 is depicted as a container, typically called bucket, adapted to be filled with a certain quantity of material in the proximity of the drive shaft 21 and to be unloaded in the proximity of the other drive shaft 22 placed at a height from the ground greater than the first drive shaft 21. In embodiments not depicted, said conveyor element 3 can be, e.g. a drag scraper element adapted to drag material for a length of path along the extension of the chain 20.

The conveyor system 1 further comprises a detection system 4 for detecting wear and/or defects. Said detection system 4 is operatively connected to said transmission assembly 2 and is designed to detect the state of wear and/or defects of said transmission assembly 2 or of at least part of its components.

As depicted, said detection system 4 comprises at least one sensor 41, 42. Said at least one sensor 41, 42 is operatively connected to said transmission assembly 2 to detect, or allow to detect, at least one operating parameter (e.g. kinematic or geometric) of said transmission assembly 2. The at least one sensor 41, 42 is equipped with a data transmission module 43 designed to transmit data representative of said operating parameters detected.

As depicted in FIGS. 1, 3 and 4, the detection system 4 comprises a control unit 44. In particular, said control unit 44 is in communication with said at least one sensor 41, 42. According to an aspect, the control unit 44 is designed to receive the data collected and sent, by means of said data transmission module 43, from said at least one sensor 41, 42 and to detect a state of wear and/or defects of said transmission assembly 2.

Figure 2:
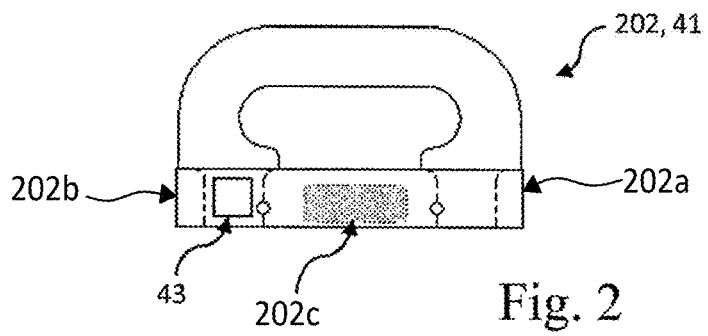
FIG. 2 depicts a detail of the conveyor system in FIG. 1.

In the embodiment of the invention depicted in FIGS. 1 and 2, said plurality of links 201 comprises at least one smart link 202 of the type capable of detecting, or allowing the detection of, an operating parameter to which the chain 20 is subjected at the same smart link 202. In this embodiment, said at least one smart link 202 constitutes or comprises at least part of said at least one sensor 41. In the embodiment of FIG. 1, the chain 20 comprises two smart links 202 arranged in opposite positions along the extension of the chain 20.

Advantageously, the at least one smart link 202 comprises at least one target, e.g. of optical type, shown as 202a in FIG. 2, or electromagnetic type, shown as 202b in FIG. 2, which is respectively detected by an optical detector, e.g. of the laser type, or by an electromagnetic detector, e.g. at least one winding in which it is possible to induce an EMF, which is fixed and external with respect to the chain 20 and which is capable of recording the passage of this target, preferably together with the time and/or speed of passage.

An embodiment in which the at least one smart link 202 comprises both an optical target and an electromagnetic target and, consequently, the detection system 4 for detecting the wear and/or defects of the conveyor system 1 is equipped with at least one optical or optoelectronic detector, and at least one electromagnetic detector, is not excluded.

According to the embodiment of FIG. 3, the at least one sensor comprises an optical sensor 42, preferably arranged in the proximity of the chain 20 to detect, by means of optoelectronic techniques (e.g. laser) or by capturing an image or video of at least one portion of the chain 20, the aforesaid optical target. In such an embodiment, said plurality of links 201 comprises at least one smart link 202 comprising, as optical target, graphic markers representative of the state of wear and/or defects and/or position of representative points of the chain 20. Specifically, the optical sensor/detector 42 is designed to detect, i.e. intercept/frame and capture, said graphic markers. The return signal of said graphic markers is then subsequently sent, by means of the data transmission module 43, to the control unit 44 for evaluating a state of wear and/or defects of the chain 20. Preferably, in this embodiment, the sensor, or detector, 42 is designed to also perform time detections, which are then combined with the optical detections to be sent, e.g. in the form of electromagnetic signals, to the control unit 44. Preferably, said at least one sensor 41, 42 may further comprise means for detecting at least one stress or mechanical strain to which said chain 20 is subjected, more specifically one or more of the links 201 of the chain 20.

Preferably, the possible one sensor 41, 42 comprising means for detecting stresses or deformations of the chain 20, is also designed to also perform position and/or time detections.

In other words, the at least one sensor 41, 42, in addition to the detection of stress/strain, is designed to also detect the position and/or time moment in which said detection of stress/strain is performed. These detections are then sent, by means of the data transmission module 43, to the outer control unit 44 which, thanks to the position and/or time information, is also able to evaluate the position inside the conveyor system 1 of the worn or defective component, thus facilitating the maintenance and repair operations.

As depicted in FIG. 2, the smart link 202, and thus the sensor 41, may preferably comprise at least one precision strain gauge. Said precision strain gauge is designed to detect a stress (deformation), or mechanical stress, to which the chain 20 is subjected at the aforesaid smart link 202. In this embodiment, as stated, the smart link 202 may comprise a data transmission module 43, e.g. consisting of a transmission circuit, e.g. of the radio frequency type, capable of sending to the control unit 44 a signal corresponding to the stress (or deformation), or mechanical strain, detected by the strain gauge 41. Said smart link 202 may be battery-powered or implement energy/power harvesting technologies or even may be powered through antennas that intercept special external electromagnetic fields (such as RFID or the like).

Preferably, the sensor 41 comprises a receiver in communication with the smart link 202 and designed to receive data sent by said smart link 202 and to send, by means of a data transmission module 43 equipped therewith, said data to the control unit 44. Said receiver is, advantageously, positioned in the proximity of the chain 20 so as to increase the reliability of the communication with said smart link 202.

In such an embodiment, the smart link 202 is designed, as stated, to allow a fixed detector of optical and/or electromagnetic type to also detect its position and/or time, or in any case to record its passage, and to simultaneously detect the stress measurements performed at that moment by the precision strain gauge present on such smart link 202. The combination of the two detections (of mechanical stress and position/time), once sent to the control unit 44 by means of the data transmission module 43, allows very accurate detection of the worn or defective component inside the conveyor system 1 and of the general state of wear of the chain and the respective components.

It should be noted that, in general, all the measurements indicative of the state of wear and/or defects and/or the position of representative points, together with any stress measurements, can be acquired and stored in a special storage device (e.g. a mass storage device of a computer) and only subsequently sent, e.g. to a controller for their subsequent processing and identification of the state of wear and/or defects of one or more components of the conveyor system 1.

It should be noted that, although presented in embodiments depicted in different figures, the detection system 4 may comprise the simultaneous presence of at least one smart link 202 of the type equipped with a strain gauge and at least one smart link 202 equipped with graphic markers, shown as 202c in FIG. 2, or other optical and/or electromagnetic targets, adapted to be detected by a respective optical and/or electromagnetic sensor/detector 42. Preferably, the at least one sensor 41, 42 may also be designed to perform temperature detections of the plurality of links 201 or the at least one smart link 202.

In FIG. 4, a further embodiment of the conveyor system 1 is depicted, wherein said chain comprises at least one pair of smart links 202 placed at a distance known therebetween during the constructing step of the same chain 20. In this embodiment, the detection system 4 comprises at least one pair of sensors 42, more specifically a pair of fixed receivers capable of detecting said at least one pair of smart links 202 equipped with respective optical targets, i.e. preferably a pair of optical sensors 42 adapted to intercept said smart links 202 as they pass by. Said pair of sensors is preferably placed at the same distance at which the two smart links, which compose the aforesaid at least one pair of smart links, are placed.

The example of FIG. 4 depicts a chain comprising two pairs of smart links 202 and one pair of optical sensors 42.

In an alternative embodiment, the chain 20 has at least one pair of smart links 202 comprising electromagnetic targets, e.g. permanent magnets, which are detected during their motion by at least one fixed electromagnetic detector, e.g. consisting of at least one electrical winding in which the permanent magnets, e.g. having different magnetic characteristics, induce an Electro Motive Force (EMF).

Under optimal conditions, i.e. when the chain 20 is not subject to wear, said pair of fixed sensors, or said fixed sensor, simultaneously or asynchronously detects the passage of each smart link of the at least one pair of smart links 202. However, following the use and wear of the components of the chain 20 or a defect thereof, a lag, represented by a time interval, may be generated during the passage of the smart links 202 with respect to the respective sensors 42 or with respect to the respective sensor. Said time interval is representative of the state of wear of the transmission assembly 2, more particularly of the state of wear or defects suffered by the components of the chain 20.

In both embodiments it is preferable, if not necessary as in the case of the smart link 202 of FIG. 1, that the data transmission module 43 implements a wireless communication standard for communicating with said control unit 44. Depending on the embodiment, the data transmission module 43 implements at least one of: Bluetooth protocols or similar protocols for WPAN (IEEE 802.15 Standard), Wi-Fi protocols (IEEE 802.11 Standard) or RFID protocols, or the like. Depending on the embodiment, said control unit 44 may be placed in the proximity of the at least one sensor 41, 42 or in a remote position with respect to the at least one sensor 41, 42 and, more generally, with respect to the rest of the conveyor system 1. For example, said control unit 44 may be a centralised processing unit shared with other analogous conveyor systems. Alternatively, said control unit 44 has a distributed architecture and implements a cloud-type service, in which the calculations are delegated to a central processing unit, typically a server, which is queried by an application typically residing on a common PC placed on the site of the conveyor system 1. In more basic embodiments, said control unit 44 is dedicated for each individual conveyor system and has software intended to evaluate the state of wear and/or defects depending on the data sent by the at least one sensor 41, 42. In the embodiments of FIGS. 1 and 3, e.g., a centralised control unit 44 placed in a remote position from the at least one sensor 41, 42 has been depicted.

Preferably, said control unit 44 is designed to store multiple data sent by the at least one sensor 41, 42 related to different time instants or positions. This amount of data can be used to extrapolate statistics or more elaborate data about the wear of the chain 20.

The invention claimed is:

1. A conveyor system for conveying materials, comprising:
   a transmission assembly comprising a closed transmission chain composed of a plurality of links interconnected to each other, said transmission assembly further comprising a drive shaft operatively connected to said transmission chain for a motion transfer;
   a conveyor element connected to said chain and designed for conveying said materials;
   a detection system for detecting wear and/or defects, operatively connected to said transmission assembly and designed to detect the state of wear and/or defects of said transmission assembly, said detection system comprising a sensor operatively connected to said transmission assembly and equipped with a data transmission module, and a control unit, in communication with said sensor, designed to receive data from said sensor and to detect a state of wear and/or defects of said transmission assembly,
   wherein said transmission assembly comprises a target link constituting or comprising part of said sensor, said target link comprising an optical or electromagnetic target that is detected by a fixed sensor, or detector, capable of detecting optically or electromagnetically such target, for the purpose of determining the state of wear and/or the position and/or speed of said target link.

2. The conveyor system according to claim 1, wherein said optical or electromagnetic detector is fixed and external to the chain, and is capable of recording the passage of said target, optionally together with the time and/or speed of passage.

3. The conveyor system according to claim 1, wherein said sensor further comprises means for detecting a stress to which said chain is subjected.

4. The conveyor system according to claim 3, wherein said target link comprises a precision strain gauge designed to detect a stress to which said target link is subjected.

5. The conveyor system according to claim 1, wherein said optical target comprises graphic markers representative of the state of wear or defects or positions of reference points of the chain, said optical detector being designed to detect said graphic markers.

6. The conveyor system according to claim 1, wherein said is designed to perform position and/or time detections.

7. The conveyor system according to claim 1, wherein said data transmission module implements at least one of the following communication protocols: Bluetooth, WPAN, Wi-Fi and RFID or the like.

8. The conveyor system according to claim 1, wherein said control unit is located in a remote position with respect to the sensor.

9. A method for detecting the state of wear and/or defects of a conveyor system according to claim 1, comprising:
   actuating said transmission assembly;

detecting, by means of said sensor, an operating parameter of said transmission assembly;

sending said operating parameter detected to said outer control unit;

evaluating a state of wear and/or defects of the transmission assembly as a function of said operating parameter sent.

10. The method according to claim 9, further comprising a step of collecting and storing time and/or space detections of the state of wear of the transmission assembly.

11. The method according to claim 9, further comprising a step of sending a maintenance request when a state of wear higher than a certain threshold is detected during said step of evaluating a state of wear of the transmission assembly.

12. The method according to claim 9, further comprising a preliminary step of arranging a pair of target links at a predetermined distance along said chain and a pair of sensors at the same predetermined distance, said method further comprising a step of measuring a lag in the passage of said pair of target links with respect to said pair of sensors, said lag being representative of a state of wear of said transmission assembly.

13. A target link insertable between two links of a closed transmission chain, composed of a plurality of links interconnected to each other, belonging to a transmission assembly of a conveyor system for conveying materials, said target link comprising a sensor, or a component thereof, of a detection system for detecting the wear and/or defects, which is operatively connected to said transmission assembly.

\* \* \* \* \*